United States Patent
Tucker et al.

(10) Patent No.: US 6,326,046 B1
(45) Date of Patent: Dec. 4, 2001

(54) PROCEDURES FOR FORMING AN EXTRUDED FROZEN NOVELTY WITH HIGH INCLUSIONS FROM A MOULDABLE MATERIAL

(75) Inventors: John Vincent Tucker; Murray Roundtree Taylor; Selma Elizabeth Morcom, all of Auckland (NZ)

(73) Assignee: Tip Top Ice Cream Company Limited, Auckland (NZ)

(*) Notice: Subject to any disclaimer, the term of this patent is extended or adjusted under 35 U.S.C. 154(b) by 0 days.

(21) Appl. No.: 09/463,389

(22) PCT Filed: Jun. 7, 1999

(86) PCT No.: PCT/NZ99/00087

§ 371 Date: Mar. 22, 2000

§ 102(e) Date: Mar. 22, 2000

(87) PCT Pub. No.: WO99/65325

PCT Pub. Date: Dec. 23, 1999

(30) Foreign Application Priority Data

Jun. 19, 1998 (NZ) .............................. 330759

(51) Int. Cl.$^7$ .......................................... A23G 9/00
(52) U.S. Cl. .................. 426/515; 62/75; 426/524
(58) Field of Search .................... 426/515, 524; 62/71, 75; 425/134

(56) References Cited

U.S. PATENT DOCUMENTS

| 4,546,615 | 10/1985 | Gram ............................ 62/73 |
| 4,986,080 | 1/1991 | Grigoli et al. ............... 62/75 |
| 5,425,958 | * 6/1995 | Fazio et al. ................ 426/515 |
| 5,435,143 | 7/1995 | Heinrich ...................... 62/75 |
| 5,516,540 | * 5/1996 | Cathenaut .................. 426/515 |

OTHER PUBLICATIONS

Ice Cream, Fourth Edition, W.S. Arbuckle, pp. 303–307, 1996.

* cited by examiner

Primary Examiner—George C. Yeung
(74) Attorney, Agent, or Firm—Jacobson Holman, PLLC

(57) ABSTRACT

Forming a novelty (such as a sticked ice cream product) from a mouldable material which involves extruding the materials into a cavity temporarily provided with a bottom. Relative movement is thereafter caused so as to shear the cavity contained quantity of material from any such material remaining in the cavity filling nozzle prior to subsequent discharge of the moulded quantity from the cavity at a time when it no longer has a bottom.

8 Claims, 7 Drawing Sheets

PROCEDURES FOR FORMING AN EXTRUDED FROZEN NOVELTY WITH HIGH INCLUSIONS FROM A MOULDABLE MATERIAL

FIELD OF THE INVENTION

The present invention relates to apparatus and procedures for forming a novelty (such as for example, an ice cream novelty with high solids inclusions) and in particular, but not necessarily solely, an apparatus and procedures (and the products of any such procedures) for forming an extruded frozen novelty with high inclusions from a mouldable material.

BACKGROUND OF THE INVENTION

As referred to in "ice cream" (Fourth Edition pages 303–307) W S Arbuckle (The AVI Publishing Company, Inc., Westport, Conn. USA) frozen novelties, typified by those made of ice cream and/or water ices, are frequently extruded and cut across the axis of the extrusion into individual pieces. Such novelties are referred to as being extruded novelties.

The full content of such pages are hereby incorporated by way of reference in their entirety.

As used herein "an extruded frozen novelty with high inclusions from a mouldable material" preferably includes an extruded or co-extruded edible material to be maintained at below 0° C. (e.g.; ice cream and/or water ice or mixtures thereof) and the high inclusions may be any solid or solids preferably edible (e.g.; fruit pieces, confectionery items, etc.). By high inclusions are preferably sufficient such inclusions to preclude or discourage a simple wire or blade cutting transversely of the extrusion or co-extrusion axis of the mouldable material owing to the potential for such a wire or blade to encounter a solid region and thus provide other than a clean separation of a discrete quantum of the high inclusion material from the extrusion mass thereof.

As used herein the term "nozzle means" can be both singular and plural to the extent required should there be a wish to extrude more than one material into each cavity or to dedicate different nozzles to specifically indexed cavities, ie; every alternate cavity.

As used herein "cavity" insofar as the carousel is concerned preferably means no more than an opening to define a periphery, and, as used herein "recess" means both said opening and a base thereof or top thereof depending on whether or not the nozzle feeds from above (preferred) or below.

SUMMARY OF THE INVENTION

It is therefore an object of the present invention to provide apparatus, procedures and products which provide an at least an alternative to existing apparatus, procedures and products.

Accordingly in a first aspect the present invention consists in apparatus for forming a novelty from a mouldable material, which apparatus comprises or includes a carousel (as hereinafter defined) having a plurality of open mould cavities formed therein (whether to the same shape or not), said carousel being rotatable so as to index each cavity to "stations" as herein defined, means providing a filling "station" which includes or comprises a nozzle, chute or other means (hereafter "nozzle means") for injecting or extruding the material into a mould cavity of the carousel when appropriately indexed therewith means to "close" the indexed mould cavity so as to define a "recess" into which said mouldable material can fill, said nozzle (or means in fixed relation thereto) being capable of co-acting with said carousel as there is relative movement to act as "shearing means" which has the effect upon rotation of the carousel of shearing the quantity of material within the recess from that material still within said nozzle means, and means providing a cavity emptying "station" comprising or including means which after such "shearing" in use will cause the movement of such material contained within an appropriately indexed cavity of the carousel out of the cavity onto a support surface whilst retaining, at least in part, some of the shape of the cavity in the material.

Reference to "carousel" and "station(s)" herein does not preclude a stationary "carousel" having a carousel-like relativity to movable stations, ie; it is the relativity of the mould cavities to the nozzle means, shearing means and the emptying means that is important.

Preferably the shearing means has the effect of smoothing (at least to some extent) the top of a dispensed amount of material and/or the bottom of the next to be dispensed amount of materials from the nozzle means.

Preferably the apparatus is of a kind that can operate a system of operations substantially as hereinafter described with reference to any one or more of the accompanying drawings.

In yet a further aspect, the present invention consists in apparatus capable of performing a method substantially as herein described by reference to FIGS. 5A through 5H.

In still a further aspect the present invention consists in a method of forming a novelty from a mouldable material (for example, high solids content ice cream, ie; the solids being discrete larger particles), which method comprises extruding the material (e.g. from nozzle means) into a cavity (at least) temporarily provided with a bottom, thereafter causing relative movement between means forming at least part of said cavity and the extrusion nozzle means or the equivalent so as to shear the cavity contained quantity of material from any such material remaining in said extrusion nozzle means or the equivalent and thereafter (preferably after the provision of a stick into the material) discharging the moulded quantity of material from the cavity no longer having a bottom (e.g. by appropriate means) on to a support surface.

Reference herein to extrusion, to extrusion nozzle means, etc. is without a mandatory requirement of the extruded cross-section of the mouldable material conforming to the cross-sectional shape of the cavity.

Preferably said cavity is at least in part provided as part of the carousel.

Preferably said method is performed using apparatus as hereinbefore defined and/or substantially as hereinafter described in more detail.

As referred to herein the materials involved include any suitable novelty material that preferably requires freezing to be mouldable and/or shape retaining but which preferably includes discrete items therein (e.g.; fruit chunks, confectionary chunks, etc.) which would render accurate cutting thereof difficult by procedures other than those of the present invention. The present invention however does not preclude the use of such apparatus in such a method with mouldable material not including such components.

In still a further aspect the present invention consists in a novelty item (preferably sticked) resulting from use of apparatus in accordance with the present invention, the use of a method of the present invention or substantially hereinafter described when manufactured by a method substantially as hereinafter described with or without reference to any one or more of the accompanying drawings.

As used herein reference to relative movement or movement of the carousel includes within its ambit intermittent or continuous movement. It is envisoned that the apparatus will be operated at high speed and therefore with conventional equipment in conjunction with the carousel and related apparatus the present invention includes incremental movement such that there is stationery indexing of cavities serially etc. at the "stations" is preferred as it offers the least complicated engineering solution.

BRIEF DESCRIPTION OF THE DRAWINGS

One preferred form of the present invention will now be described with reference to the accompanying drawings in which;

FIGS. 5A through 5H is a diagrammatic representations of the procedures of the present invention showing (without recognizing the different projection that will be afforded by the rotation of the carousel about its arc of movement, ie; the drawing being presented diagrammatically in a linear fashion for ease of explanation), a series of steps in which;

FIG. 5A shows the carousel interposed between nozzle means and an underlying plate which co-acts with the cavity of the carousel to provide a closed bottom recess into which material (shown as a dotted matrix) fills under the assistance of urging of a normal extrusion kind and preferably also gravity, FIG. 5A shows the arrangement of FIG. 5B as the carousel rotates to the right showing how the nozzle means provides for a shearing thereof, the dotted outline showing how (if desired) a plate or other means in fixed relationship to the nozzle means can assist in maintaining the smoothness of the quantum of material emerging to the right of the nozzle means, FIG. 5C shows the carousel moved further rotationally in the arrowed direction and now substantially free of the nozzle means although it may possibly be under the dotted plate of FIG. 5B, FIG. 5D shows the next serially presentation of a cavity to the nozzle means, such a cavity now being supported underneath by the closing plate of the filling station, FIG. 5E shows a stick having been inserted into the moulded mass, such stick insertion if desired occurring whilst there is a protective plate top and bottom of the quantum of material if deemed appropriate (this however is not shown in FIG. 5E for ease of explanation), FIG. 5F shows the sticked novelty then moving from the preferred stationery condition of FIG. 5E to a next stage where the emptying means is capable of moving downwardly on to the mass of material of the now bottomless cavity indexed therewith so as to press the material down on to the underlying freezing plate and/or conveyor, FIG. 5G shows the next stage of that ejection of the quantum of material from the indexed cavity, the small arrows simply being representative of the provision of a blast of a gas such as air to help free the material from the pad or other means used to eject it, and FIG. 5H shows the discrete item on the support surface free of the carousel and in a condition where it can be moved off for any downstream processing including coating, packaging or the like.

DETAILED DESCRIPTION OF THE PREFERRED EMBODIMENTS

Persons skilled in the art will appreciate how the sequence of steps described generally in relation to FIGS. 5A through 5H provide a departure from prior art methods of forming a novelty and particularly a sticked frozen core novelty.

Preferably all of the materials that have a food contact capability are of a food grade material selected from stainless steel or an appropriate plastics material. Preferably the apparatus operates in conditions that supports the shape retaining characteristics of the material.

A preferred form of material is a premium or ice cream having high solids content with some discrete edible inclusions, for example, nuts, fruit, confections, etc.

Figure 1:
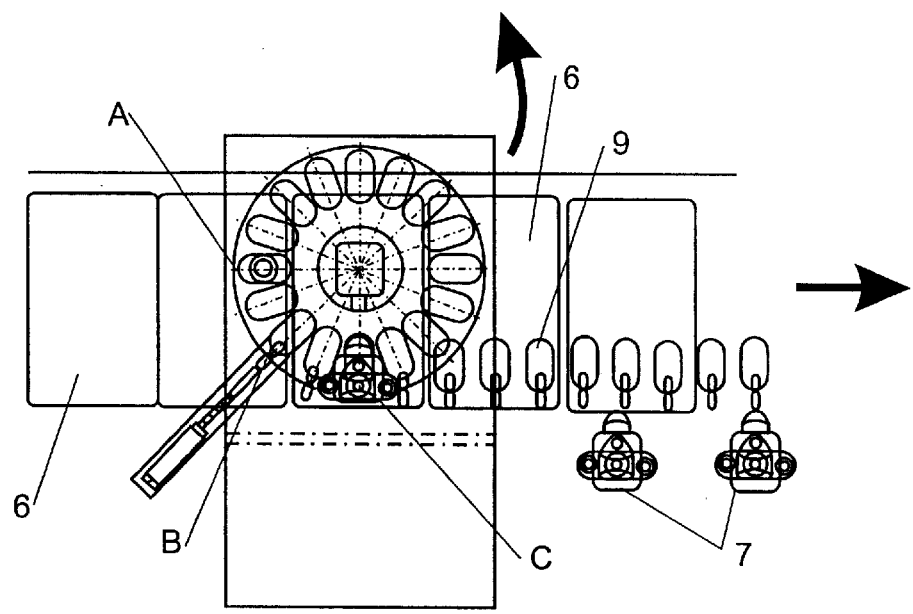
FIG. 1 is a diagrammatic plan view of an apparatus in accordance with the present invention showing the filling station as "A", a stick insertion station as "B", the provision of a shearing means between stations "A" and "B" arising from the rotation of the carousel to index between those conditions (continuously or preferably intermittently) and showing an emptying means and station "C", the arrow to the right showing the direction of progress of a support surface defined by a conveyor and the arrow about the carousel showing the preferred direction of continuous or preferably intermittent indexed rotation thereof relative to the stations.
Figure 2:
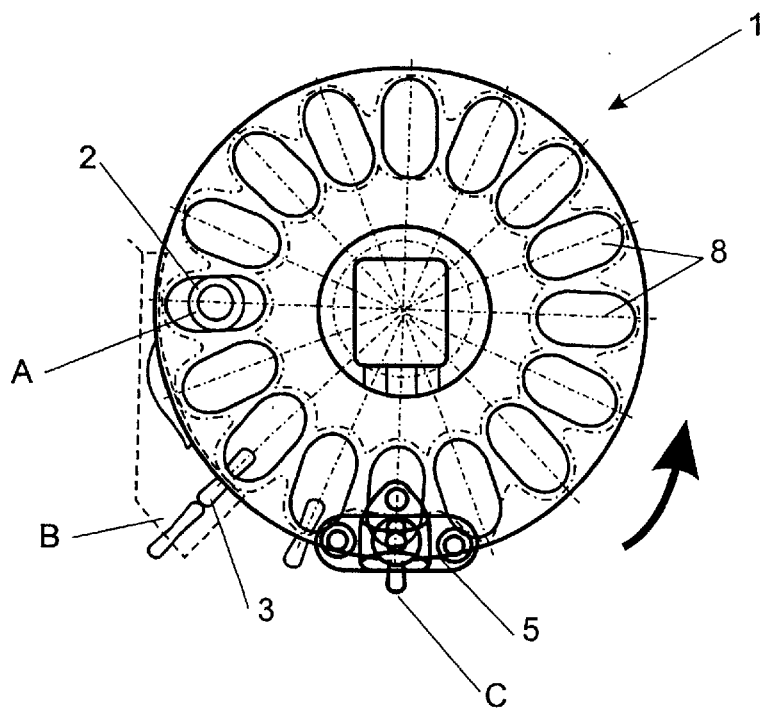
FIG. 2 is an enlarged version of the carousel proper as shown in FIG. 1.
Figure 3:
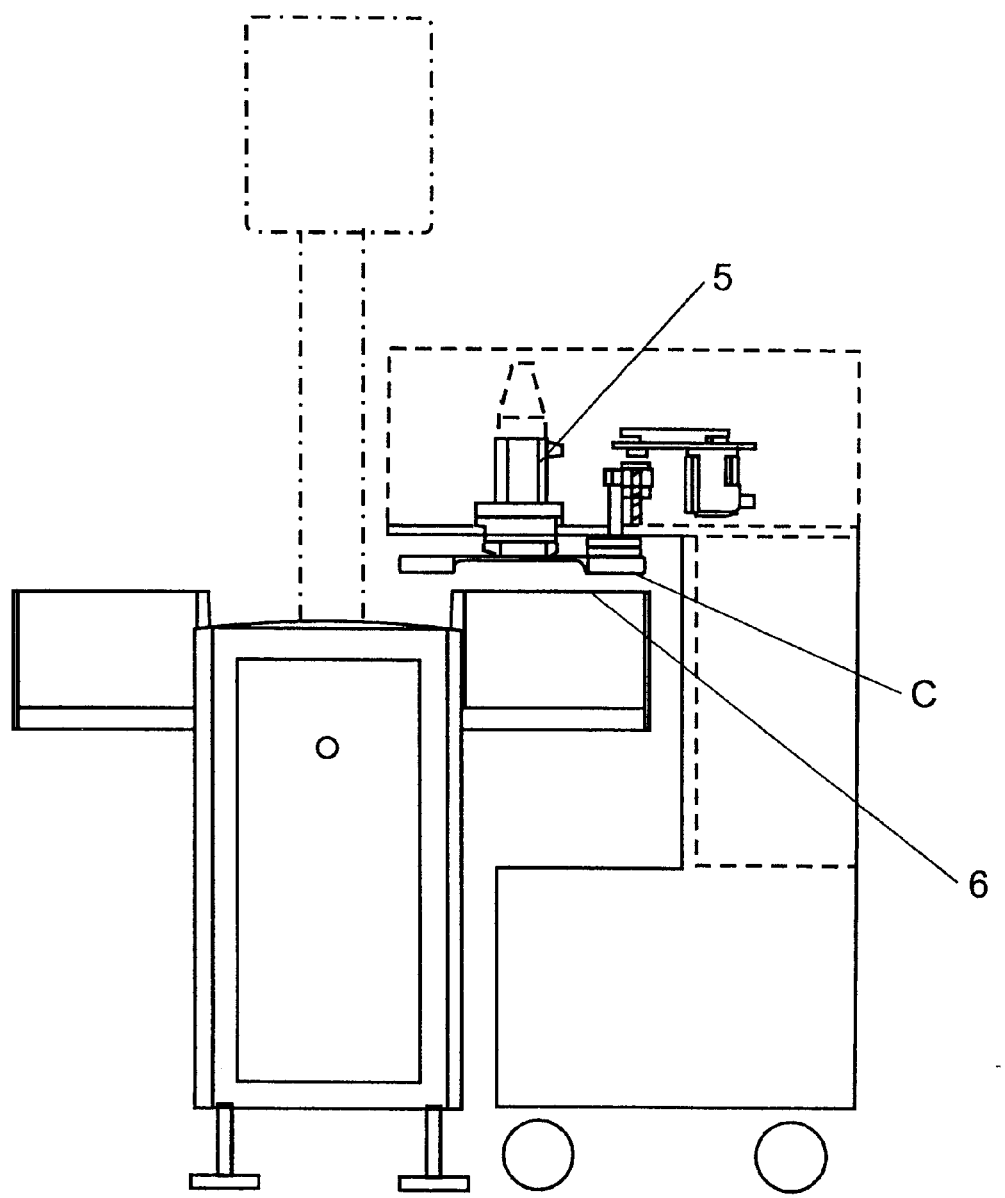
FIG. 3 is an elevational view of an apparatus as depicted in FIGS. 1 and 2 looking along the axis of the conveyor and showing the position of the support surface of the conveyor under regions of the carousel which will index with the emptying means above the support surface.
Figure 4:
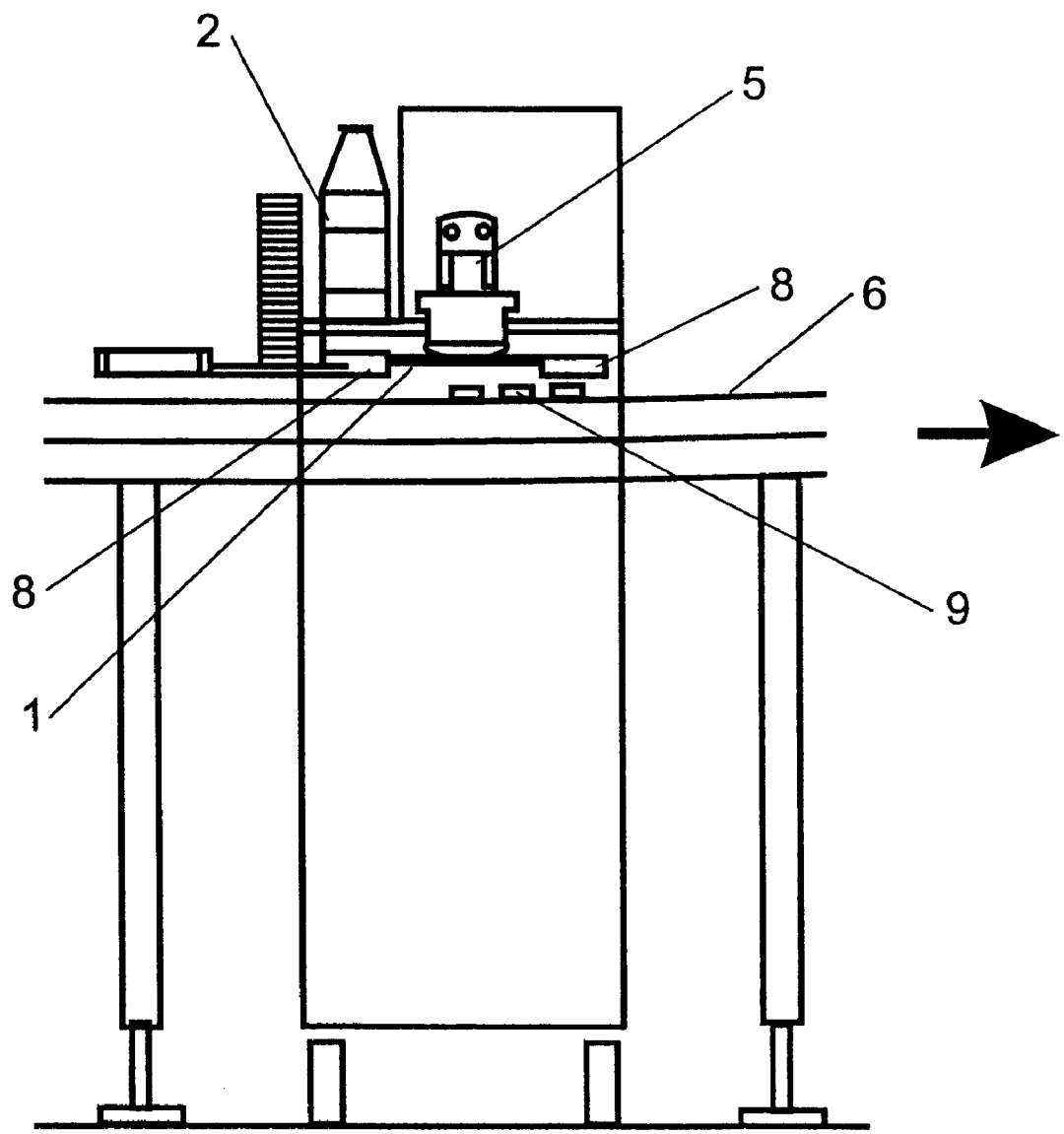
FIG. 4 is a view also in side elevation showing part of the apparatus of FIG. 3 but transversely of the conveyor direction.
Figure 5A:
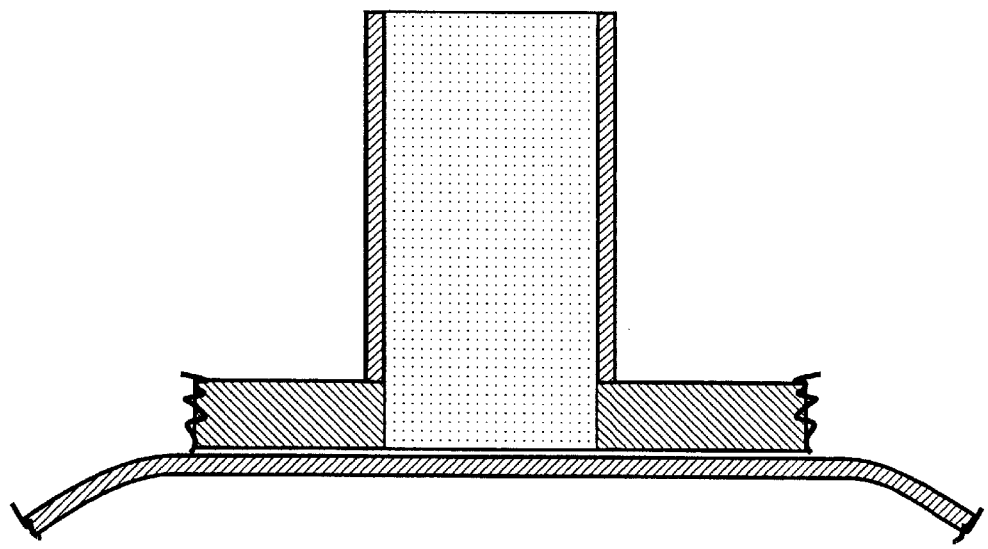
Figure 5B:
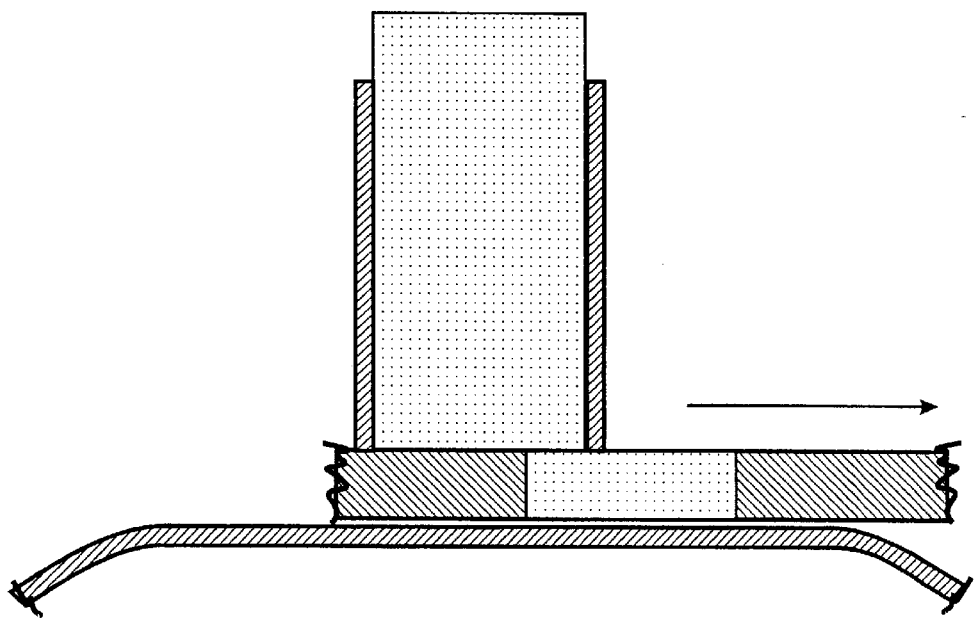
Figure 5C:
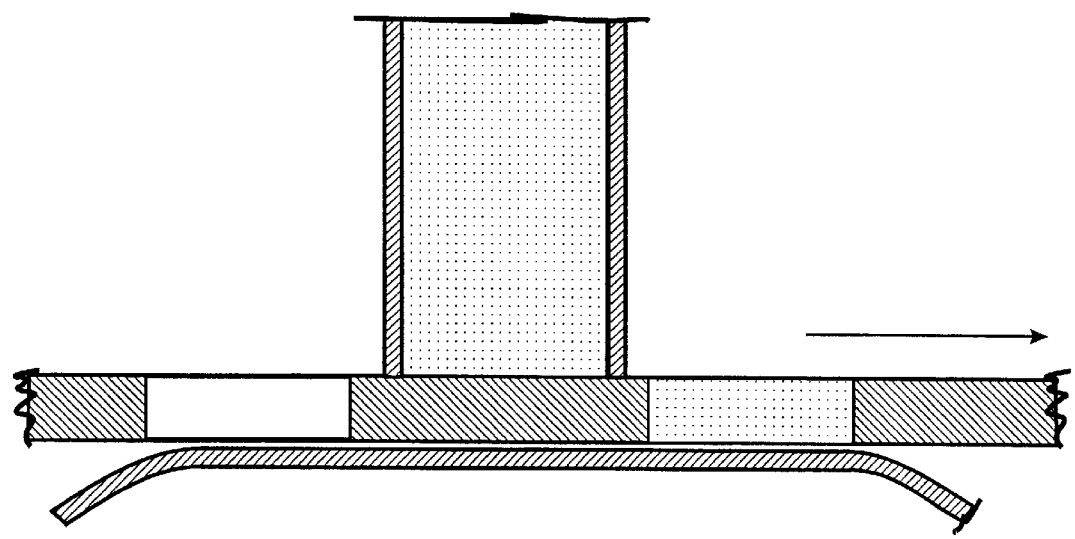
Figure 5D:
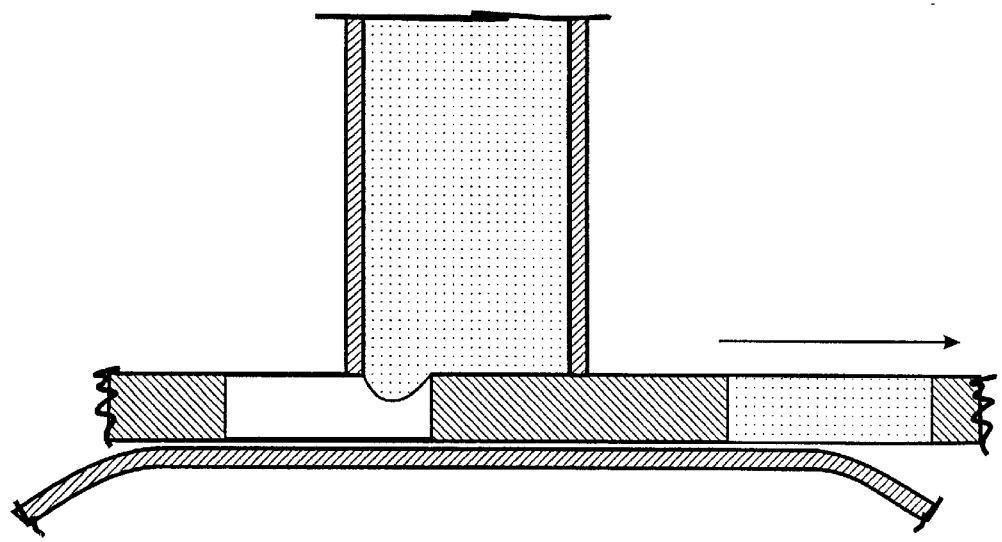
Figure 5E:
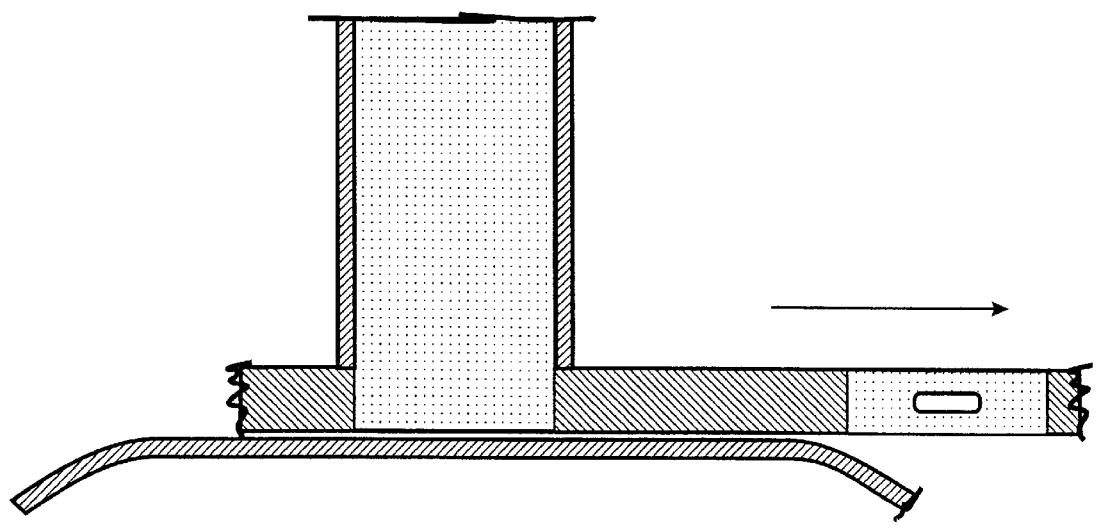
Figure 5F:
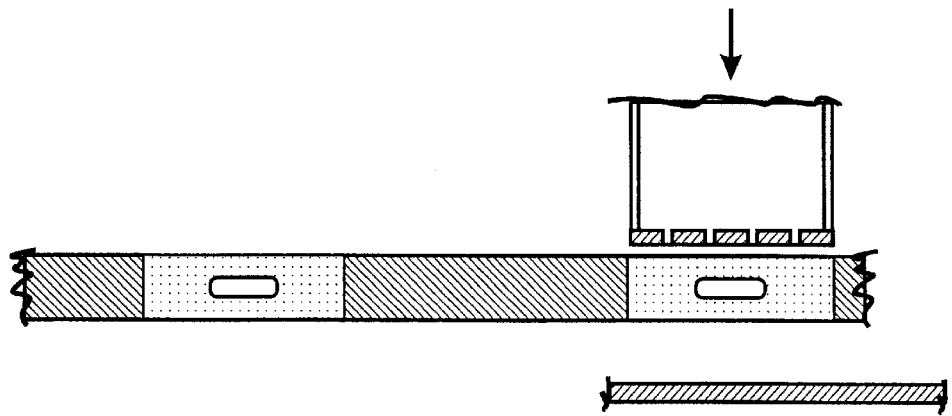
Figure 5G:
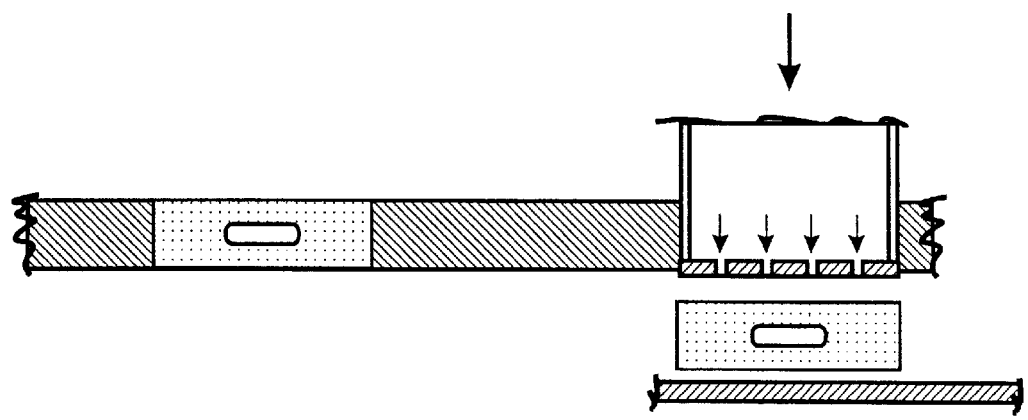
Figure 5H:
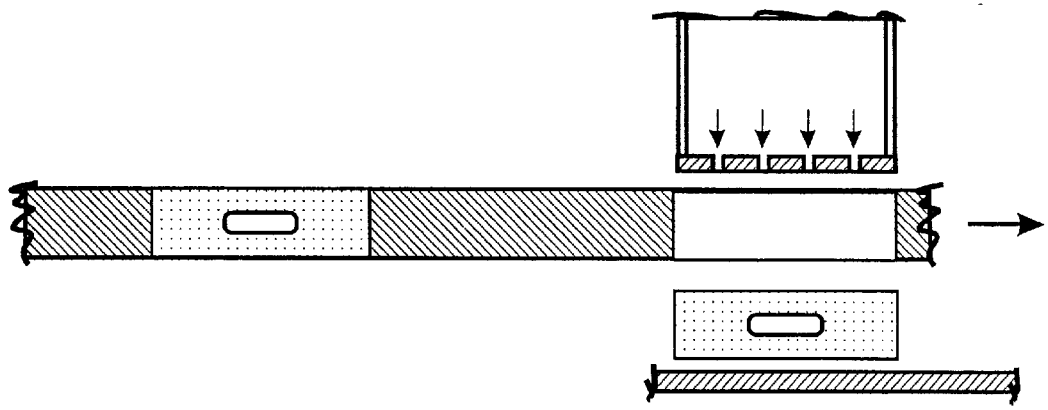

Preferably the apparatus has the carousel depicted as 1 mounted about an axis of rotation as shown to rotate incrementally in the arrowed direction shown in FIGS. 1 and 2 so as to serially present mould cavities 8 first to the filling station "A" at which a filling nozzle 2 extrudes material into the underlying indexed cavity 8, then has that quantum of the material sheared from the remainder of the material in the filling extrusion nozzle 2 prior to presentation at station "B" to a stick insertion stage. The material 4 in the cavity 8 has a stick 3 inserted therein in a manner known in the art and/or described in Arbuckle.

The carousel 1 then rotates through index conditions to where the emptying station "C" is reached at which point a pneumatic or hydraulic or solenoid actuated means 5 preferably downwardly (and in a reproducible manner) depresses the quantum of material from within the mould cavity down on to the underlying support surface 6 provided by the conveyor thus leaving sticked ice cream products 9 on the conveyor 6 which bear the semblance of the shape of the cavities from which they have been depressed.

Preferably the cavities are unbottomed and to the extent needed preferably any underlying support for the material as it is injected in to each cavity 8 is provided thereunder. Preferably however the consistency of the material is such that no such underlying support is required, ie; there is sufficient control on the pressure of the filling extrusion nozzle 2 so that a required quantum of material is injected or extruded into a particular indexed cavity and then is sheared from the remainder of the material upon the programmed rotation of the carousel relative to the filling extrusion nozzle 2 and its surrounding support structure at least part of which preferably acts as shearing means in conjunction with the carousel.

Persons skilled in the art will appreciate how any manner of means can be provided to uplift or depress a component from an open topped and open bottomed mould cavity and preferably this is performed in such a way as depicted so that the sticked frozen novelties 9 can be processed as may be required after stick engagement or the like by means 7 or the like at some downstream processing stations all well known in the art.

Persons skilled in the art will also appreciate how preferably survey control for both index and press accuracy is provided for the carousel and its ancillary functional components, e.g.; actuation means 5, etc.

Enhancements of the system include the prospect of co-extrusion of materials into the cavities and/or radial injection or extrusion of materials about the stick 3 at prior to and/or subsequent to stick insertion. For example, a chocolate that is molten or some equivalent materials could be injected to set about the stick.

Whilst preferred forms of the present invention have been described with each cavity 8, any identical disposition of cavities can be provided such that carousels can be swapped to provide for different shapes or individual cavities can provide for a variety of different shapes owing to the different cavity forms provided in the single cavity. In this latter instance preferably the area of contact of the emptying means is such as to be generic of all of the cavity forms so as to allow with minimal adjustment other than for the cavities for the ancillary emptying apparatus.

Having disclosed the broad the concept of operation of the apparatus and methods of the present invention, persons skilled in the art will appreciate how much of the componentry exists as standard equipment known in the art and all such disclosure of such equipment whether in Arbuckle or otherwise is hereby here included by way of reference.

What is claimed is:

1. A method of forming a frozen edible novelty from an edible mouldable material, said method comprising:

extruding the material through an extrusion nozzle into a cavity temporarily provided with a bottom, thereafter causing relative movement between at least part of said cavity and the extrusion nozzle so as to shear the cavity contained quantity of material from any material remaining in said extrusion nozzle, and thereafter discharging the moulded quantity of material from the cavity on to a support surface after removal of the bottom of the cavity.

2. The method of forming a frozen edible novelty as claimed in claim 1, wherein the extension nozzle extrudes a cross-section of material substantially conforming to a cross-section of said cavity.

3. The method of forming a frozen edible novelty as claimed in claim 1, wherein the material is ice cream.

4. The method of forming a frozen edible novelty as claimed in claim 3, wherein the cavity contained material is sticked prior to the discharging thereof.

5. The method of forming a frozen edible novelty as claimed in claim 1, wherein said cavity is at least in part provided as part of a carousel.

6. The method for forming a frozen edible novelty as claimed in claim 1, wherein the relative movement between the at least part of the cavity and the extrusion nozzle forms a smooth surface on at least one of a surface of a dispensed amount of material and a surface of the material retained in the nozzle.

7. The method for forming a frozen edible novelty as claimed in claim 5, wherein said carousel is rotating with respect to the extrusion nozzle to cause shearing of the cavity.

8. The method for forming a frozen edible novelty as claimed in claim 1, wherein the removal of the bottom of the cavity provides a gap for vertical lowering of the cavity contained material out of the cavity.

\* \* \* \* \*